United States Patent [19]
Sinicropi et al.

[11] Patent Number: 5,453,112
[45] Date of Patent: Sep. 26, 1995

[54] PRESSURE SWING ADSORPTION HEAT RECOVERY

[75] Inventors: Michael J. Sinicropi, Cheektowaga; Timothy M. Aaron, Williamsville; Frederick W. Leavitt, Amherst; Herbert R. Schaub, E. Amherst; James Smolarek, Boston, all of N.Y.

[73] Assignee: Praxair Technology, Inc., Danbury, Conn.

[21] Appl. No.: 190,426

[22] Filed: Feb. 2, 1994

[51] Int. Cl.$^6$ ................................................ B01D 53/047
[52] U.S. Cl. .................... 95/41; 95/103; 95/106; 95/130; 96/112; 96/128; 96/130
[58] Field of Search ...................... 95/39–41, 96, 95/99, 106, 130, 103; 96/112, 126–128, 130, 146

[56] References Cited

U.S. PATENT DOCUMENTS

| | | | |
|---|---|---|---|
| 3,069,830 | 12/1962 | Skarstrom et al. | 96/126 X |
| 3,734,293 | 5/1973 | Biskis | 96/126 X |
| 3,800,507 | 4/1974 | Howell et al. | 96/126 X |
| 3,866,428 | 2/1975 | Simonet et al. | 95/130 X |
| 3,973,931 | 8/1976 | Collins | 55/58 |
| 4,026,680 | 5/1977 | Collins | 95/99 |
| 4,472,178 | 9/1984 | Kumar et al. | 95/99 |
| 4,496,376 | 1/1985 | Hradek | 96/112 |
| 4,511,375 | 4/1985 | BeVier | 55/28 |
| 4,614,525 | 9/1986 | Reiss | 95/96 |
| 4,674,560 | 6/1987 | Marcellin | 165/1 |
| 4,698,073 | 10/1987 | Rohde et al. | 96/130 X |
| 4,783,432 | 11/1988 | Settlemyer | 502/34 |
| 4,787,919 | 11/1988 | Campbell et al. | 55/16 |
| 4,954,146 | 9/1990 | Garrett et al. | 95/96 |
| 4,971,606 | 11/1990 | Sircar et al. | 55/25 |
| 5,137,548 | 8/1992 | Grenier et al. | 95/41 |
| 5,152,812 | 10/1992 | Kovach | 95/41 |
| 5,160,355 | 11/1992 | Toppel | 55/269 |
| 5,169,413 | 12/1992 | Leavitt | 95/96 |
| 5,203,889 | 4/1993 | Brown | 96/128 X |
| 5,240,475 | 8/1993 | Anderson et al. | 95/99 |
| 5,268,022 | 12/1993 | Garrett et al. | 95/130 X |

FOREIGN PATENT DOCUMENTS

| | | | |
|---|---|---|---|
| 53-037585 | 4/1978 | Japan | 95/96 |
| 55-032706 | 3/1980 | Japan | 96/128 |
| 61-025619 | 2/1986 | Japan | 95/96 |
| 61-038616 | 2/1986 | Japan | 96/126 |
| 63-104630 | 5/1988 | Japan | 95/96 |
| 1-242121 | 9/1989 | Japan | 96/112 |
| 0563379 | 8/1944 | United Kingdom | 96/128 |
| 0042159 | 12/1981 | WIPO | 95/130 |
| WO88/00084 | 1/1988 | WIPO | 95/96 |

*Primary Examiner*—Robert Spitzer
*Attorney, Agent, or Firm*—Alvin H. Fritschler

[57] ABSTRACT

Waste heat generated within a pressure swing adsorption system is effectively captured and utilized to preheat the feed gas passing to a feed gas blower for compression to the desired adsorption pressure level. The energy efficiency of the system, and overall system performance, are thereby enhanced.

20 Claims, 2 Drawing Sheets

PRESSURE SWING ADSORPTION HEAT RECOVERY

BACKGROUND OF THE INVENTION

1. Field of the Invention

The invention relates to pressure swing adsorption for the separation of gases. More particularly it relates to the recovery and utilization of waste heat in pressure swing adsorption operations.

2. Description of the Prior Art

Pressure swing adsorption (PSA) processes are a desirable means for the separation and purification of gases, as in the production of oxygen or nitrogen by air separation. PSA processes involved the (1) selective adsorption of a more readily adsorbable component of a feed gas mixture at an upper adsorption pressure, with discharge of the less readily adsorbable component; (2) desorption of the more readily adsorbable component at a lower desorption pressure; and (3) repressurization from the lower desorption pressure to the upper adsorption pressure. Such operations, and variations thereof, are carried out in PSA systems comprising one or more adsorbent beds containing adsorbent material capable of selectivity adsorbing the more readily adsorbable component of a feed gas mixture from a less readily adsorbable component thereof. The processing is carried out in each bed on a cyclic basis interrelated to the carrying out of the processing sequence in each of the other beds in the system. A variety of commercially available adsorbent materials are suitable for use in PSA operations. A convenient class of adsorbent materials for such purposes is zeolitic molecular sieve materials, such as zeolite 5A or 13X materials, which are capable of selectively adsorbing nitrogen from feed air.

In the operation of PSA systems, heat is liberated upon adsorption, and heat is taken up by the adsorbent material upon desorption. Hence, the temperature of the adsorbent beds tends to rise during the adsorption step, and to drop during the desorption step. In typical PSA processing, such as for the production of oxygen and/or nitrogen from air, the forward flow of gas during adsorption exceeds the backward flow of gas during desorption. As a result, there is a net flow forward of heat, which tends to reduce the average temperature of the adsorbent beds employed in a PSA system.

PSA processes, particularly those using advanced adsorbents that are strongly adsorbent with respect to the more selectively adsorbable component of the feed gas, such as LiX, CaX or other zeolites prepared by ion-exchange of sodium zeolites, are very sensitive to adsorbent temperature. PSA processes, including vacuum pressure swing adsorption (VPSA) processes in which a subatmospheric desorption pressure are employed, appear to operate most favorably with a particular temperature within the adsorbent beds. Field data suggests that performance variations in excess of 10% would be likely if control of this optimal temperature is not addressed. It is important to note that VPSA systems employing advanced adsorbents utilize low pressure ratios relative to traditional PSA systems. As a result, there is a relatively small amount of heat being generated by the feed air machine, i.e. compressor, due to the heat of compression. This results in a feed air temperature, and resulting adsorbent temperature, that is largely a function of ambient conditions. Since advanced adsorbents sometimes require certain temperatures for desired performance, it is often important to find an efficient way to add heat to the adsorbent other than that provided by the feed air machine.

Due to the dependence of feed temperature on changes in ambient temperature, enough heat is not always generated through the feed air heat of compression to reach the desired adsorbent bed temperature levels. Adequate adsorbent bed temperature levels occur naturally under warm ambient conditions as the heat of compression from the feed air machine will generate enough heat in the feed stream to adequately warm the adsorbent above the ambient temperature to desired levels. In cases where the heat of compression is inadequate to serve such heat generation purposes, however, other means of heating the adsorbent, or the feed air or other feed gas, must be obtained in order to raise the adsorbent temperature and optimize system performance. In this regard, it should be noted that warm and cold ambient temperature conditions are not related to specific temperatures. Warm conditions exist, for purposes hereof, when the heat of compression from the feed air generates adequate heat to achieve optimal adsorbent bed temperatures, while cold conditions exist when some other means of adding heat to the VPSA or other PSA system is needed in order to obtain optimum process temperatures.

Prior attempts have been made to provide heat to an adsorbent bed that is operating at cooler than optimal conditions. While the heat of compression of the feed air is a desirable source of heat, no satisfactory augmentation of this generated heat has been adapted. A convective heat exchanger at the inlet of the adsorbent bed has been proposed, which also serves to provide developed heat flow distribution. It has also been proposed to use warm process gases to provide direct heat transfer to the adsorbent bed.

There remains, however, a need in the art for obtaining improved means for controlling adsorbent temperature to obtain enhanced PSA/VPSA performance. In particular, there is a need for a means to control adsorbent temperature while enhancing the energy efficiency of the overall system.

It is an object of the invention, therefore, to provide an improved process and system for controlling the temperature of adsorbent beds in PSA/VPSA air or other gas separation operations.

It is another object of the invention to provide an improved process and system for enhancing the energy efficiency of PSA/VPSA systems operating at desired adsorbent bed temperature conditions.

With these and other objects in mind, the invention is hereinafter described in detail, the novel features thereof being particularly pointed out in the appended claims.

SUMMARY OF THE INVENTION

The invention utilizes low grade waste heat available in the PSA or VPSA system itself to upgrade performance of the system. Such heat, which would otherwise be lost for purposes of a desired air or other gas separation process, enables the energy efficiency of the system, and overall system performance, to be enhanced.

BRIEF DESCRIPTION OF THE DRAWING

The invention is hereinafter described in detail with reference to the accompanying drawings in which.

DETAILED DESCRIPTION OF THE INVENTION

The invention accomplishes the objectives thereof by the recovery and use of waste heat that would otherwise be lost in PSA or VPSA air or other gas separation operations. Such waste heat, which is used to preheat the air or other gas feed mixture passing to the feed air or other feed gas blower that delivers the feed gas to the adsorbent beds of a PSA or VPSA system. By the recovery and use of said waste heat, the energy efficiency of the air or other gas separation operation is enhanced. Moreover, the increase in feed air or other gas temperature passing to the feed blower enables the compressed feed gas passing to the PSA/VPSA system to be at a higher temperature than would otherwise be reached upon compression of the feed gas at ambient temperature conditions, enabling the desired adsorbent bed temperature conditions to be achieved. Under cold ambient temperature conditions, therefore, the practice of the invention provides an advantageous means for achieving the desired bed temperature conditions. Whenever the heat of compression generated during the compression of the feed gas to a desired upper adsorption pressure level would not be sufficient to obtain the desired temperature conditions for optimum operation of the PSA or VPSA system, the invention facilitates the reaching of said desired temperature conditions in a convenient and efficient manner.

Figure 1:
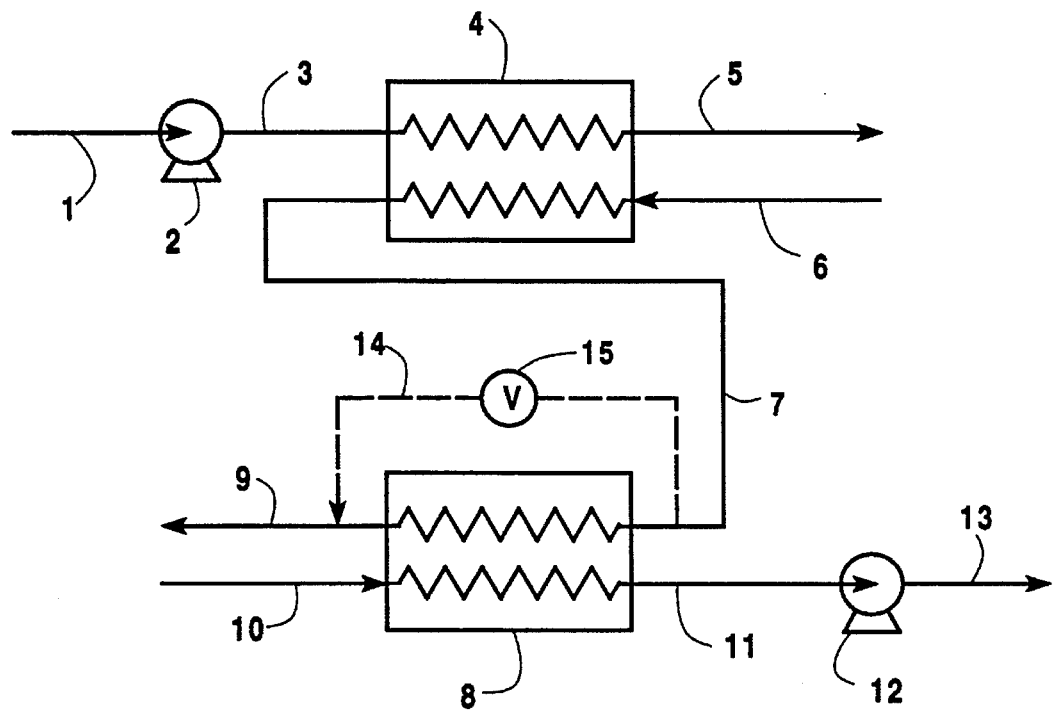
FIG. 1 is a schematic drawing of an embodiment of the invention in which waste heat recovered from a product compressor or blower is used to preheat the feed air passing to a feed air blower of a PSA or VPSA system.

In the practice of the invention in the embodiment illustrated in FIG. 1 of the drawings, product oxygen is passed in line 1 from a PSA or VPSA system to product oxygen compressor 2 for compression to a desired product level. The compressed oxygen is passed in line 3 to product heat exchanger 4, from which the product oxygen is recovered in line 5 for delivery to a customer or desired use. In said heat exchanger 4, the product oxygen is cooled to recover its heat of compression by heat exchange with a coolant, conveniently water, passed thereto in line 6. The coolant, after having been heated in said heat exchanger 4, passes therefrom in line 7 for passage to feed air preheat heat exchanger 8. Upon being cooled therein, the coolant is discharged through line 9 for recycle to product heat exchanger 4. Optionally, stream 9 may pass to other equipment, such as other heat exchangers or a cooling tower prior to recycle. Feed air in line 10 is passed to said preheat exchanger 8 for preheating prior to passage in line 11 to feed air blower 12 for compression to the desired adsorption process level before passage in line 13 to the PSA or VPSA system being employed for air separation and recovery of product oxygen.

In the FIG. 1 embodiment, a by-pass control means can be employed to conveniently control the amount of waste heat recovered in preheat heat exchanger 8 for use in preheating feed air to the PSA/VPSA system. Thus, by-pass line 14 containing control valve 15 can be used to divert a portion of the heated coolant passing in line 7 to said preheat heat exchanger 8. In relatively warm ambient conditions, less preheat of the feed air in line 10 may be needed so that, upon subsequent compression in feed air blower 12, the feed air is passed in line 13 at the desired temperature to achieve a desired temperature condition in the downstream PSA or VPSA system. It is also within the scope of the invention to divert all or a portion of the compressed oxygen product in line 3 around product heat exchanger 4, during warm ambient temperature conditions in which the heat of compression of feed air alone, without feed air preheat by waste heat recovery and utilization, is adequate to achieve the desired temperature conditions during the PSA or VPSA air separation operation.

In the practice of the embodiment illustrated in FIG. 1, those skilled in the art will appreciate that the coolant exiting any product aftercooler, intercooler or other heat exchanger on the product compressor, product booster compressor or desorption vacuum blower oil cooler unit, may be used to heat the feed air (or other feed gas) by means of a heat exchanger, such as said preheat heat exchanger 8, before it enters feed air blower 12. Thus exchanging heat prior to the passage of feed air to said feed air blower 12 provides the largest temperature difference between the feed air and the warm water or other heated coolant, thereby achieving the most efficient heat transfer between coolant and feed air or other feed gas. Although there may be specific conditions wherein heat exchange with the compressed feed air may be satisfactory, the amount of heat that could be added thereby would be reduced as compared to heating the inlet of the feed air blower with waste heat in the practice of the invention.

From the above, it will be appreciated that the need for the application of the invention should initially be determined. For this purpose, the feed temperature required to achieve the desired bed temperature is first determined. For example, if the average feed pressure of a VPSA system is 5 psig, the temperature rise due to the heat of compression, upon compressing feed air to the pressure level, will be approximately 50° F. This temperature rise value can be obtained from the blower manufacturer, as in this example of the invention, or assumptions can be made as to the efficiency of the feed air blower and its motor, whereby the energy transfer to the feed air can be easily calculated. Knowing this temperature rise value, the inlet air temperature to be added thereto to obtain the desired feed air inlet temperature to the adsorbent beds in the PSA/VPSA system. For example, if 100° F. is the optimal feed temperature desired for a given air separation application, then any feed air blower/PSA or VPSA system that is subject to ambient temperatures of less than 50° F. will need heat added to obtain the desired optimal process temperatures. By calculating the mass flow rate of the feed air, the amount of additional heat required in order to reach the desired adsorbent temperature can readily be determined. By effectively utilizing waste heat that otherwise would be lost, as in the embodiment illustrated in FIG. 1, the practice of the invention serves to optimize the energy efficiency of the air or other gas separation PSA/VPSA operation, and the process performance thereof, thereby enhancing the overall technical/economic feasibility of employing the desirable PSA technology in practical, commercial gas separation operations.

Figure 2:
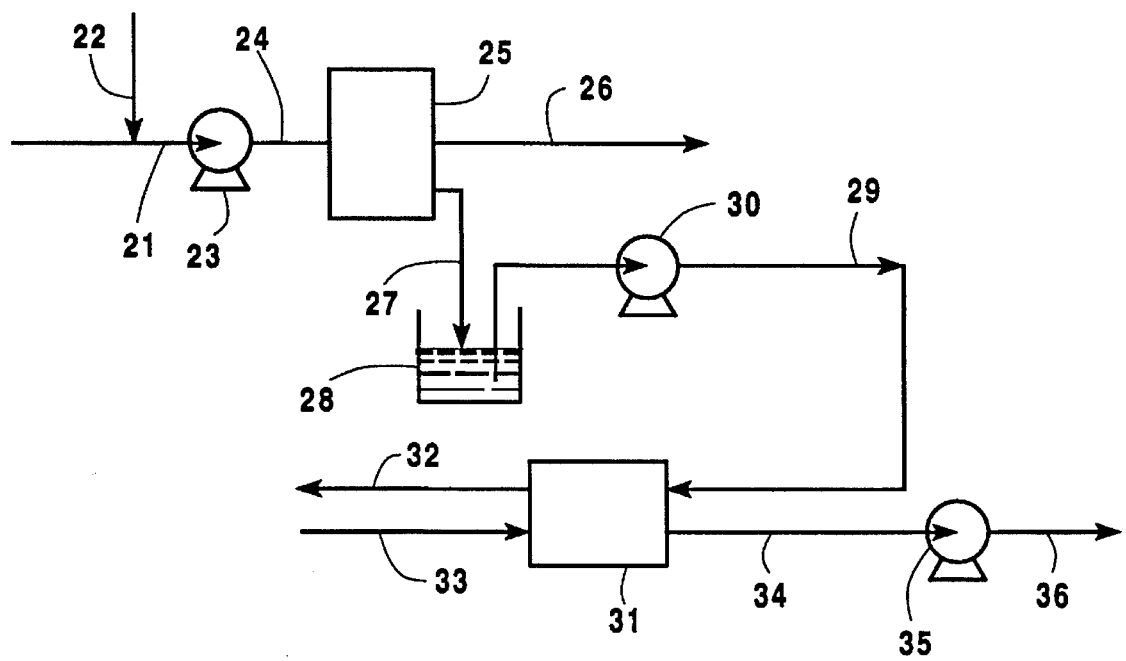
FIG. 2 is a schematic drawing of an embodiment in which waste heat present in vacuum discharge separation drain water is used to preheat the feed air passing to the feed air blower of a PSA or VPSA system.

In the embodiment of the invention illustrated in FIG. 2 of the drawings, the warm water at the drain of a vacuum blower discharge separator is used as a source of waste heat recovery for preheating the feed air or other feed gas prior to compression thereof to the desired adsorption pressure level. This water, which contains vacuum blower seal water and water separated from the desorbed component in the air or gas separation operation, can be collected in a separate drain water collection vessel.

In the FIG. 2 embodiment, the more readily adsorbable component, upon desorption from the adsorbent material, is passed in line 21, together with said vacuum blower seal water from line 22, to vacuum blower 23. The discharge thereof is passed in line 24, at the lower desorption pressure, to a conventional discharge separator 25 from which the more readily adsorbable component of the feed gas mixture being separated is withdrawn through line 26. In air separation for the production of oxygen as the less readily adsorbable component of feed air, the desorbed more readily adsorbable component is nitrogen, which would typically be discharged to waste. Warm drain water is passed from discharge separator 25 through line 27 to drain water collection vessel 28. For the heat recovery purposes of the invention, such warm drain water is pumped through line 29 by water sump pump 30 positioned therein for introduction into preheat heat exchanger 31. The cooled drain water, upon release of heat in said preheat heat exchanger 31, is discharged through line 32. Feed air or other feed gas to be separated by PSA processing is passed in line 33 to said preheat heat exchanger 31 and, upon being preheated therein, is passed in line 34 to feed blower 35 for compression and passage in line 36 to the PSA/VPSA system at the desired upper adsorption pressure. The heat content of the warm drain water would otherwise be lost as a low grade waste heat of the PSA processing operation. In the practice of the invention, however, such waste heat is advantageously and effectively utilized to enable desirable PSA temperature conditions to be achieved when cool ambient temperature conditions preclude the obtaining of the desired temperature levels by the use of the heat of compression of the feed gas alone.

Figure 3:
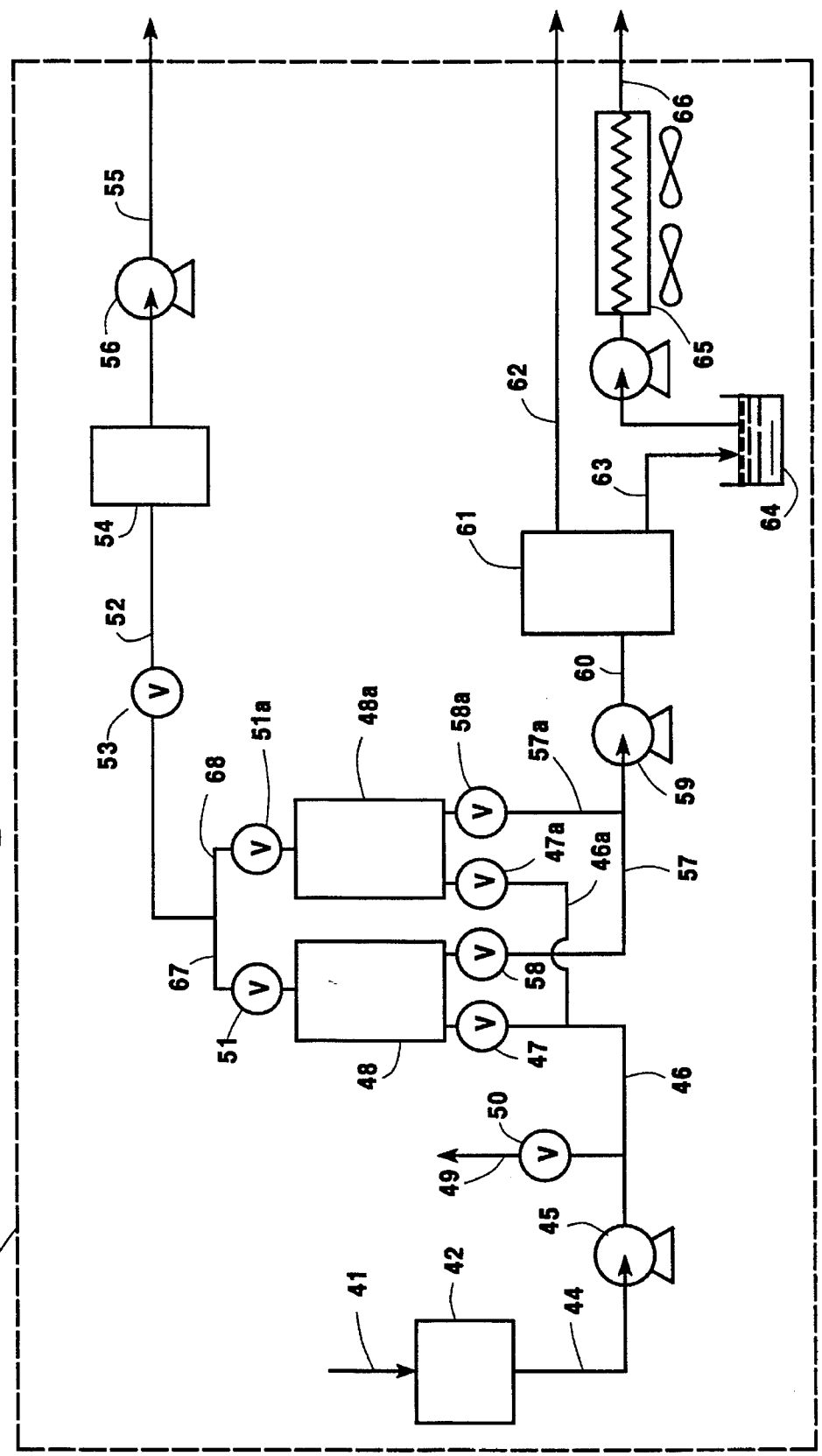
FIG. 3 is a schematic drawing of an embodiment of the invention in which an insulated enclosure is used to recover waste heat from all or parts of a PSA or VPSA system for use in preheating the feed air passing to the feed air blower of a PSA or VPSA system.

Useful heat, for purposes of the invention, can also be collected in a number of ways from radiating heat sources. Processing equipment such as process blower and the drive motors therefor, product compression components, closed loop cooling system equipment, process piping, machine inlet and discharge auxiliaries and/or any other piece of process equipment provide convective and radiation sources of recoverable waste heat. As illustrated in FIG. 3 of the drawings, an enclosure building can be used to enclose therein component parts or all of a PSA/VPSA system so as to capture radiated waste heat for advantageous use in preheating inlet feed air or other feed gas for the system. The captured heat contained within the enclosure building, which can be an insulated enclosure, conveniently heats the incoming feed air or gas. By positioning the inlet filter inside the enclosure, the heat captured upon radiation from the enclosed portions of the overall system will be transferred directly to the feed gas (air) that is passed to the feed gas (air) blower. Thus, in said FIG. 3, feed air is passed in inlet line 41 to inlet filter 42 positioned within enclosure 43 used to enclose, in the illustrated embodiment, all of the component parts of a VPSA air separation system. From inlet filter 42, feed air is passed in line 44 to feed air blower 45 from which compressed air at a desired adsorption pressure is passed in line 46, containing valve means 47, to first adsorbent bed 48, or in line 46a, containing valve means 47a, to second adsorbent bed 48a of an illustrated two-bed VPSA system. Feed unload line 49, containing valve 50, extends from line 46 so as to divert feed air flow for venting, if desired. The less readily adsorbable component of feed air, i.e. oxygen when conventional zeolitic molecular sieves are used to selectively adsorb nitrogen from feed air, is passed through line 67, containing valve 51, from bed 48, and through line 68, containing valve 51a, from bed 48a during the adsorption-product recovery portion of the VPSA processing sequence. In the illustrated embodiment, oxygen is passed from one such line or the other to line 52, containing valve 53, for passage to product oxygen storage vessel 54. Product oxygen is withdrawn from said storage vessel through line 55, containing product oxygen blower unit 56, for discharge from enclosure 43 and delivery to an oxygen product customer or to a desired use for such oxygen product of the VPSA system. It will be understood that oxygen can be passed from the top or product end of one adsorbent bed to the other through lines 50 and 50a, or a portion of the product oxygen from product oxygen storage vessel 54 can be passed back through line 52 to one bed or the other depending on the particular processing sequence employed in any given VPSA air separation operation carried out in the illustrated VPSA system.

As shown, gas, e.g. the more readily adsorbable nitrogen component of feed air, can, upon desorption from the adsorbent material, be withdrawn from bed 48 through line 57, containing valve 58, for passage to vacuum blower 59. The more readily adsorbable nitrogen can likewise be withdrawn from bed 48a through line 57a, containing valve 58a, for passage to line 57 and to vacuum blower 59. The discharge from said vacuum blower 59 is passed in line 60 to discharge separator 61 from which nitrogen is discharged to waste, or to a desired use, through line 62. Drain water is separately withdrawn from discharge separator 61 through line 63 for collection in drain water collection vessel 64.

The use of enclosure 43 enables other methods of recovering heat to be employed, such as the incorporation of a heat exchange unit 65 in said collection vessel 64. For example and as illustrated, said heat exchange unit 65 may be a fin fan heat exchanger so that heat is radiated therefrom throughout the interior of enclosure 43 so that it can be drawn in through feed air blower inlet filter 42. The drain water, after having been passed through said heat exchanger 65 to release heat to the interior of said enclosure 43, is conveniently withdrawn through line 66 for passage to the drain or to a desired use thereof. Those skilled in the art will appreciate that, if less heat recovery is needed to achieve the desired optimum temperature in the PSA/VPSA adsorbent beds, it is within the scope of the invention to utilize radiated heat from only parts of the overall PSA/VPSA system, as by enclosing only parts, but not all, of the system within said enclosure 43. The recovery of heat from the warm drain water removed from discharge separator 62 is a convenient and desirable source of waste heat recovery. The placing of said drain water collection vessel 64 within an enclosure, desirably an insulated enclosure, is a preferable means for recovering waste heat for the preheating of the feed air (gas) passing to the feed air (gas) blower, with or without the use of said fin fan heat exchanger 65 or other such heat exchangers for facilitating and enhancing the recovery of waste heat from the warm drain water.

Those skilled in the art will appreciate that various changes and modifications can be made in the details of the invention without departing from the scope of the invention as set forth in the appended claims. It will be understood that the invention is not dependent on the particular PSA or VPSA processing sequence employed, or whether air separation or some other gas separation operation is to be carried out, or the particular operating conditions employed, e.g. upper and lower pressure levels employed. Furthermore, the waste heat captured and utilized in the practice of the invention can include any one or combination of the low grade waste heat sources indicated above or any other low grade waste heat generated in any part of the overall adsorption system. As used herein, low grade waste heat is any source of heat generated in the PSA/VPSA system, otherwise commonly lost, that can be effectively captured and utilized to preheat the feed gas mixture prior to its passage to the feed gas compressor. It will also be appreciated that various other sources of waste heat can be used in the practice of the invention. For example, while the waste stream in an oxygen PSA/VPSA system is a nitrogen enriched stream that cannot be safely vented within an enclosure building, the waste heat present in the waste nitrogen-enriched stream can be utilized, through appropriate exchange of heat, to heat some type of liquid that, in turn, can provide a source of heat to the feed air to be separated. Waste heat can likewise be recovered from the oxygen off-line vent stream removed during initial startup or during product quality excursions. The air feed stream, however, can be vented directly inside an enclosure building, as shown in FIG. 3, since the feed air is not harmful and provides some heat from the compression of air that occurs during feed air compressor idle times that may occur in the processing cycle.

In the practice of the invention, the waste heat recovered and utilized to preheat the feed gas (air) mixture will generally be such as to raise the temperature of the feed gas typically at least 10° F. and generally not more than 80° F., most typically in the range of about 20°–50° F. Under 0° F. ambient conditions, for example, it may be desirable to utilize available waste heat to increase the feed gas (air) temperature to about 70° F. At 30° F. ambient conditions, the waste heat recovery may be desirable to increase said feed gas (air) temperature by about 40°–60° F. In any event, the use of low grade waste heat generated in the overall PSA/VPSA system itself to raise the inlet gas temperature, without external heat addition, although causing more work to be expended for feed gas compression and the like, nevertheless surprisingly results in an improved overall PSA/VPSA performance.

The recovery of waste heat from various heat sources within a PSA/VPSA system, and the utilization of such waste heat for preheating the feed gas (air) to a feed gas (air) blower, thus enhances process performance and energy efficiency over approaches in which external energy is added to the system. The practice of the invention provides a further advantage in that it does not require complex adsorbent bed designs, altered process operation or reduction in mass flow in the system in order to enhance the heat transfer of the adsorbent.

To illustrate the economic advantage of the waste heat recovery of the invention, as contrasted to approaches in which external heat is added to the system, it should be noted that a VPSA feed blower will have a discharge temperature of approximately 60° F. due to the heat of compression at a time when the ambient air is 10° F., i.e. an additional 50° F. above ambient temperature. If the heat were added to the compressed feed air rather than to the inlet feed air to achieve a desired feed air temperature of 100° F., the added operating and equipment costs associated therewith would be doubled.

In prior approaches to improving the performance of PSA systems, waste heat recovery has not been generally considered because the high capital intensity of such systems has caused capital cost reduction to be targeted in efforts to reduce total system costs. In order to recover waste heat, however, the expenditure of additional capital cannot be avoided. As a result, such design improvements are commonly overlooked, and no motivation for the capture and use of low grade waste heat for preheating the feed gas mixture before compression had been identified. The benefits of avoiding the 10% reduction in PSA performance noted above is found, however, to greatly offset such additional capital cost expenditures. Moreover, the invention enables such benefits to be realized by effectively capturing and utilizing low grade waste heat, having a low heat transfer potential relative to other heat sources. The preheating of the cool inlet feed air with such otherwise waste heat, to maximize heat exchange, and the use of an enclosure building as a heat sink from which inlet air can be drawn, represent highly desirable advantages in heat utilization, leading to enhanced energy efficiency and, surprisingly, to enhanced PSA/VPSA performance.

Those skilled in the art will appreciate that any desired combination of waste heat recovery techniques herein described can be used to provide the desired amount of preheat to the feed gas (air) to achieve the desired temperature conditions in the adsorbent bed(s) for optimal PSA performance. If multiple waste heat recovery sources are used in the practice of the invention, they can be controlled to turn on and off any desired combination thereof to provide the required amount of heat for feed gas preheat purposes. While PSA air separation operations for the production of oxygen are referred to specially hereinabove, it will also be understood that the invention can be practices with respect to a variety of other gas separation operations, such as the separation of nitrogen from helium, or from hydrogen, with nitrogen being the more readily adsorbable component of the gas mixture, or the separation and recovery of nitrogen product from air, with either nitrogen or oxygen being the more readily adsorbable component to feed air.

The invention will be seen as a highly advantageous means of capturing and utilizing waste heat generated within a PSA system. The convenient recovery of waste heat, and its effective utilization, without the need for heat addition from outside the system, enables the energy efficiency of the PSA process to be enhanced while, at the same time, enhancing the overall performance of the PSA system.

We claim:

1. In a pressure swing adsorption process for the separation of a more readily adsorbable component of a feed gas mixture containing said component and a less readily adsorbable component in an adsorption system including at least one adsorbent bed containing adsorbent material capable of selectively adsorbing said more readily adsorbable component, said process comprising a processing sequence carried out in each bed on a cyclic basis and including (1) introducing a feed gas mixture to the feed end of the bed at an upper adsorption pressure, and withdrawing the less readily adsorbable component from the opposite end of the bed; (2) decreasing the pressure of the bed to a lower desorption pressure, with release of more readily adsorbable component from the feed end of the bed; and (3) repressurizing the bed to said upper adsorption pressure, with the feed gas mixture being compressed to said upper adsorption pressure in a feed gas compressor prior to passage to the bed during step (1) thereof and being heated by the resulting heat of compression, with said heat of compression under cool ambient temperature conditions not being sufficient to achieve a desired adsorbent bed temperature, the improvement comprising (a) capturing waste heat generated in the adsorption system, or portions thereof, and (b) utilizing the captured waste heat to preheat the feed gas mixture passing to said feed gas compressor, the feed gas mixture passing to the bed at the upper adsorption pressure having been preheated by said captured waste heat and further said heat of compression, whereby the energy efficiency of the process is enhanced and such waste heat recovery enables the feed gas mixture to attain a higher temperature than would be attained upon compression of the feed gas mixture alone at under cool ambient temperature conditions, thereby enhancing the performance of the process.

2. The process of claim 1 in which the less readily adsorbable component withdrawn from said opposite end of the bed is compressed to a higher pressure level before being recovered from the adsorption system, and including (a) passing the further compressed less readily adsorbable component gas to a heat exchanger for the transfer of heat of compression generated by the further compression thereof to a coolant fluid, and (b) passing the thus-heated coolant fluid to a preheater for transfer of said heat of compression to the feed gas mixture prior to the passage of said feed gas mixture to said feed gas compressor.

3. The process of claim 2 and including diverting a portion of the thus-heated coolant fluid around the preheater so as to adjust the amount of heat transferred from the thus-heated coolant fluid to said feed gas mixture.

4. The process of claim 2 in which said lower desorption pressure is a subatmospheric pressure.

5. The process of claim 4 and including drawing the more readily adsorbable component through a process blower, separating warm drain water from said more readily adsorbable component and passing said warm drain water to a preheater for transfer of waste heat therefrom to the feed gas mixture therein prior to passage of said feed gas mixture to said feed gas compressor.

6. The process of claim 1 and including positioning the overall adsorption system, or portions thereof, within an enclosure so as to capture heat from components thereof for use in preheating the feed gas mixture prior to its passage to the feed gas compressor.

7. The process of claim 6 and including drawing the more readily adsorbable component at a lower subatmospheric desorption pressure through a process blower, separating warm drain water from said less readily adsorbable component and passing said warm drain water to a collection vessel positioned inside said enclosure, the waste heat radiating from said warm drain water being used to heat said feed gas mixture passing to said feed gas compressor.

8. The process of claim 7 and including drawing the feed gas mixture through an inlet filter positioned within said enclosure.

9. The process of claim 7 in which said feed gas mixture comprises air.

10. The process of claim 9 and including venting feed air from the unload compression thereof during periods of idle in the processing cycle within said enclosure.

11. The process of claim 7 and including passing said warm drain water to heat exchange means positioned within said enclosure to facilitate recovery of waste heat from said warm drain water to the atmosphere within the enclosure.

12. In a pressure swing adsorption system for the separation of a more readily adsorbable component from a feed gas mixture containing said component and a less readily adsorbable component, said adsorption system containing at least one adsorbent bed containing adsorbent material capable of selectively adsorbing said more readily adsorbable component, said adsorption system being adapted for the carrying out of a processing sequence in each bed, on a cyclic basis, including (1) introducing a feed gas mixture to the feed end of the bed at an upper adsorption pressure, and withdrawing less readily adsorbable component from the opposite end thereof; (2) decreasing the pressure of the bed to a lower desorption pressure, with release of more readily adsorbable component from the feed end of the bed; and (3) repressurizing the bed to said upper adsorption pressure, with the feed gas mixture being compressed to said upper adsorption pressure by a feed gas compressor forming a part of the overall adsorption system prior to passage to the bed during step (1) thereof, with the heat of compression generated under cool ambient temperature conditions not being sufficient to achieve a desired bed temperature, the improvement comprising (a) mechanical means for capturing waste heat generated in the adsorption system, or portions thereof, and (b) means for utilizing the captured waste heat to preheat the feed gas mixture passing to the feed gas compressor, whereby the adsorption system effectively utilizes waste heat generated therein to preheat the feed gas mixture passing to said feed gas compressor, thereby enhancing the energy efficiency and overall performance of said adsorption system.

13. The adsorption system of claim 12 and including (a) compression means for increasing the pressure level of the less readily adsorbable component before its recovery from the adsorption system; (b) a heat exchanger for the transfer of the heat of compression generated for said compression means to a coolant fluid; and (c) preheater means for the transfer of said heat of compression from the coolant fluid to said feed gas mixture prior to its passage to the feed gas compressor.

14. The adsorption system of claim 13 and including control means for directing a portion of the coolant fluid around the preheater means to adjust the amount of heat transferred in said preheater means to the feed gas mixture.

15. The adsorption system of claim 12 in which said system is adapted for subatmospheric desorption pressure operation and including (a) a process blower for drawing the more readily adsorbable component from the bed; (b) separator means for separating the more readily adsorbable component from accompanying warm drain water; and (c) preheater means for transferring waste heat from the warm drain water to the feed gas mixture upstream of the feed gas compressor.

16. The adsorption system of claim 12 and including enclosure means within which the overall adsorption system, or portions thereof, are positioned so as to capture heat from components thereof for use in preheating the feed gas mixture upstream of the feed gas compressor.

17. The adsorption system of claim 16 in which said system is adapted for subatmospheric desorption pressure operation and including (a) a process blower for drawing the more readily adsorbable component from the bed; (b) separator means for separating the more readily adsorbable component from accompanying warm drain water; and (c) a collection vessel positioned inside said enclosure, said collection vessel being adapted to enable waste heat recovery from the warm drain water for use in heating the feed gas mixture upstream of the feed gas compressor.

18. The adsorption system of claim 17 and including an inlet feed gas mixture filter that is positioned within said enclosure.

19. The adsorption system of claim 17 and including (a) heat exchange means positioned within said enclosure to facilitate recovery of waste heat from the warm drain water to the atmosphere within the enclosure and (b) conduit means to pass the warm drain water to said heat exchange means.

20. The adsorption system of claim 16 and including vent means for venting the feed gas mixture within the enclosure during feed gas compressor unload periods.

* * * * *